Dec. 22, 1942.   M. D. LARDIN   2,306,314
MANUFACTURE OF LAMINATED GLASS
Filed Dec. 5, 1940

Inventor
MAURICE D. LARDIN

By  Olen E. Bee
Attorney

Patented Dec. 22, 1942

2,306,314

UNITED STATES PATENT OFFICE 2,306,314

MANUFACTURE OF LAMINATED GLASS

Maurice D. Lardin, Tarentum, Pa., assignor to Pittsburgh Plate Glass Company, Allegheny County, Pa., a corporation of Pennsylvania Application December 5, 1940, Serial No. 368,605

2 Claims. (Cl. 49—81)

The present invention relates to laminated glass, and more particularly to a process of manufacture thereof.

One object of the invention is the provision of certain intermediate steps in the manufacture of laminated glass, whereby a more perfect product is obtained.

A second object of the invention is to provide a means for correcting imperfections in laminated glass, in order to decrease the percentage of rejects in the ordinary production.

Other objects and advantages of the invention will become more apparent from the following detailed description of a preferred embodiment thereof.

Laminated glass is ordinarily prepared by uniting plates of glass to an interposed plastic reinforcing material under controlled pressure and temperature. The glass plates and plastic sheet are assembled, passed through nipper rolls or otherwise preliminarily pressed and the assemblies are exposed directly to fluid pressure in an autoclave. Where, because of low spots in the plastic sheeting or of irregular spaces on the glass plates, an imperfect edge seal results during the preliminary pressing operation, the final pressing does not correct the bond but the pressing fluid penetrates the edges of the assembly. Obviously, therefore, the resultant laminated glass cannot be sold and it is necessary to re-claim the glass or cut the plate down to a smaller size. In either case, the cost of manufacture is materially increased.

Briefly stated, the present invention contemplates the correction of imperfectly edge sealed laminated glass by addition of plastic to the imperfect sections to secure a proper seal thereof, preliminary to the final pressing operation.

Figure 1:
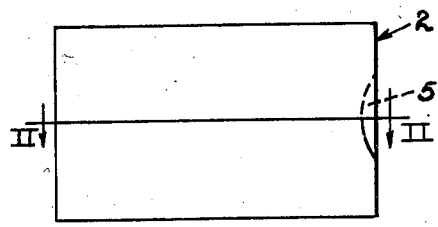
Figure 1 is an elevational view of an imperfectly sealed plate of laminated glass to which my invention is applicable.
Figure 2:
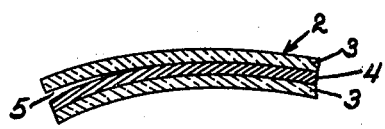
Figure 2 is a fragmentary sectional view thereof taken substantially along the line II—II of Figure 1.

Referring to the drawing, a plate 2 of laminated glass comprises a plurality of plates 3 of glass united to an interposed plastic reinforcing material 4 under controlled temperature and pressure. The plates of glass and the plastic material are assembled and passed through nipper rolls or otherwise preliminarily pressed to form a temporary union facilitating the handling of the assembly and the final pressing thereof. In many instances the assembly will contain an unsealed area 5 after preliminary pressing because of low spots in the plastic 4 or of irregular spaces on the edges of the glass plates 3. This is particularly noticeable in connection with the lamination of bent glass wherein irregularities in the curvature of the glass plates are more apt to occur.

Figure 3:
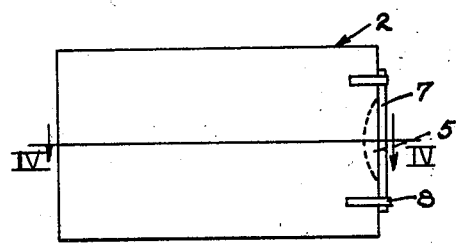
Figure 3 is an elevational view of the plate of laminated glass at an intermediate stage of treatment.
Figure 4:
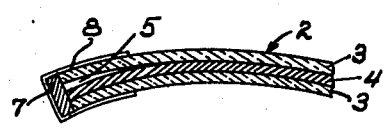
Figure 4 is a fragmentary sectional view thereof taken substantially along the line IV—IV of Figure 3.
Figure 5:
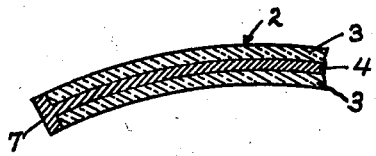
Figure 5 is a fragmentary vertical sectional view of a laminated plate after treatment.

As shown in Figures 3 and 4, a strip 7 of plastic, identical in composition to that employed in the intermediate layer 4, is positioned along the edge of the imperfectly sealed area 5 by suitable means, as for example, tapes 8. The plate is then placed in a rubber bag which is evacuated and the bag is subjected to heat and pressure. This action results in the plastic of the strip 7 being forced into unsealed area 5 to secure a proper seal thereof. The plastic thus added to the assembly is welded to the intermediate layer 4 and becomes an integral part thereof.

The treated plate is then removed from the rubber bag and put through the final pressing operation by direct exposure to heated fluid in an autoclave. After the lamination has been completed the excess plastic remaining along the edges of the plates 3 may be removed.

The invention is particularly applicable to the manufacture of laminated glass in which a polyvinyl acetal resin is used as the plastic reinforcing material. The vinyl acetals, being thermoplastic resins, will soften sufficiently when heated to permit additional resin to be bonded thereto and made an integral part thereof. The invention is, however, applicable where other types of thermoplastic reinforcing materials, such as the acrylate resins, are employed.

Because of the fact that it is possible through the application of my invention to decrease the percentage of imperfectly united plates of laminated glass resulting in standard production, there will be a considerable saving in manufacturing costs. The labor necessary to accomplish the special treatment is much less than that required to reclaim the glass from rejected assemblies, or in cutting poorly laminated plates into smaller sizes.

It will at once be apparent that various modifications and adaptations of my invention are possible without departing from the spirit thereof or the scope of the appended claims.

What I claim is:

1. In a method of making a laminated glass unit, the steps which comprise assembling glass plates with resinous interlayer material, preliminarily pressing them together to hold them in assembled relation preparatory to permanent bonding thereof, inspecting the preliminarily pressed assembly for an area of edge separation between interlayer material and glass, placing a strip of interlayer material over the area of edge separation, and permanently securing the assembled glass and interlayer material including the strip under conditions of sufficient heat and pressure to bond them together and fill the area of separation.

2. In a method of making a laminated glass unit, the steps which comprise assembling glass plates with resinous interlayer material, preliminarily pressing them together to hold them in assembled relation preparatory to permanent bonding thereof, inspecting the preliminarily pressed assembly for an area of edge separation between interlayer material and glass, placing a strip of interlayer material over the area of edge separation, placing the preliminarily assembled elements in a rubber bag, evacuating the bag, and permanently securing the assembled glass and interlayer material, including the strip under conditions of sufficient heat and pressure to bond them together and fill the area of separation.

MAURICE D. LARDIN.